Figure 1:
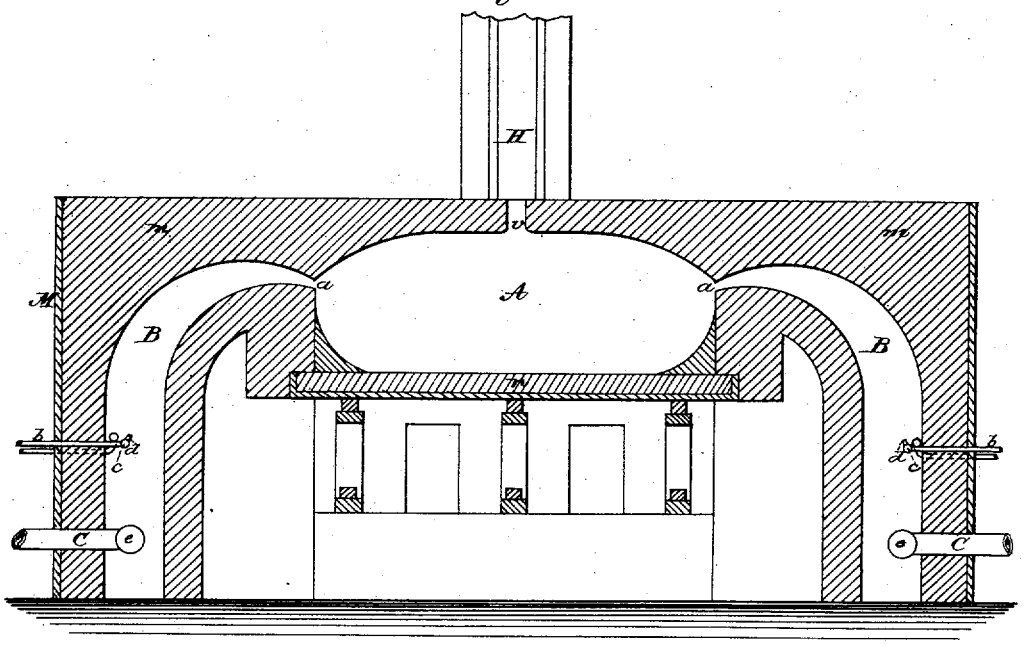

J. G. BLUNT.

Processes and Apparatus for Puddling Iron and Steel.

No. 5,367. Reissued April 22, 1873.

Witnesses:
T. C. Brecht
Wm. H. Anderson

Inventor:
Jas. G. Blunt

THE NORRIS PETERS CO., PHOTO-LITHO., WASHINGTON, D. C.

UNITED STATES PATENT OFFICE.

JAMES G. BLUNT, OF LEAVENWORTH, KANSAS, ASSIGNOR OF ONE-HALF INTEREST TO MERRITT H. INSLEY, OF SAME PLACE.

IMPROVEMENT IN PROCESSES AND APPARATUS FOR PUDDLING IRON AND STEEL.

Specification forming part of Letters Patent No. 129,268, dated July 16, 1872; reissue No. 5,367, dated April 22, 1873; application filed April 17, 1873.

*To all whom it may concern:*

Be it known that I, JAMES G. BLUNT, of the city of Leavenworth, county of Leavenworth and State of Kansas, have invented a new and valuable Improvement in Furnaces for the conversion of pig or cast iron into wrought or bar iron, and for the reheating of the same for rolling, by the use of petroleum vapor or hydrocarbon gas, with or without the combination of superheated steam.

This invention relates to puddling and reheating furnaces and processes for treating iron; and consists in the construction of the same and the novel arrangement and devices whereby petroleum-vapor or hydrocarbon-gas and superheated steam are used as fuel to puddle and reheat iron in such furnaces. The object of this invention is to manufacture wrought or bar iron from the pig or cast metal, and produce a superior quality of iron, and at less cost than by any other known process; which result is accomplished by reason of the greater intensity of the heat produced and the greater purity of the flame or heat applied than that produced by coal or any other known fuel, whereby, in conjunction with the chemical agency of the petroleum vapor, all sulphur, phosphorus, and other impurities in the metal are decomposed, eliminated, and driven off, and resulting in the production from the puddling-furnace of a neutral or homogeneous iron of great value.

It is known to all iron manufacturers that the property termed "red-short" largely predominates in many of the best iron ores of this country, and that bar-iron puddled from such metal with coal cannot be worked at a red or "flanged heat;" and to overcome this difficulty "cold-short" iron has to be mixed with the same in the puddling process to render the product a neutral iron, and vice versa in the puddling of cold-short metal; and, while the mixing of these metals of opposite constituents neutralizes each other and produces an approximation to homogeneous iron, it is obvious that the impurities of the metal are not decomposed and driven off, but simply unite to counteract each other and detract from the native quality of each metal, and produce iron much inferior to that produced by my process, by which all the impurities are removed by the action of the petroleum-vapor flame, and a perfect homogeneous iron produced from any quality of pig or cast iron without mixing with other metals.

To enable others to use my invention, I proceed to describe its construction and mode of operation.

Figure 2:
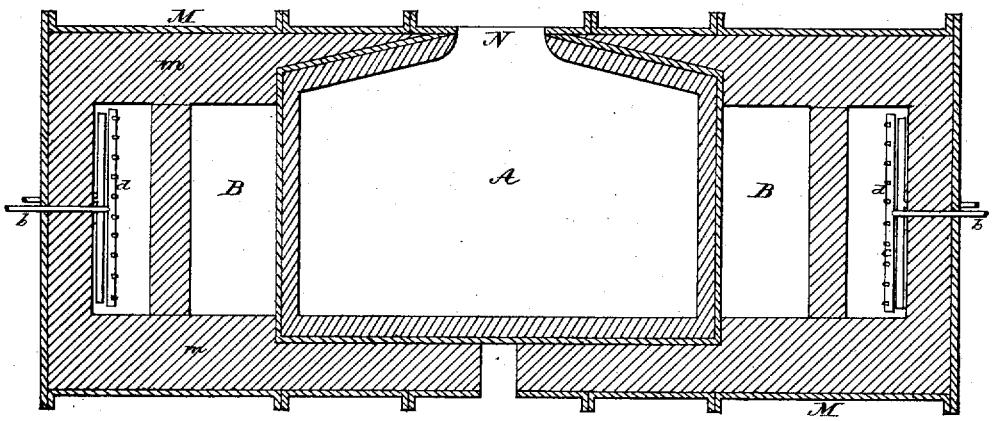

Figure 1 in the accompanying drawing is a longitudinal vertical section of my furnace, and Fig. 2 a horizontal section of the same.

A represents the boiling-oven for puddling or for reheating files when used for that purpose, there being no difference in the puddling and reheating furnaces, except the construction of the bottom or hearth of the same. B represents the combustion-chamber or flame-flues, which extend up vertically for a distance, or until about on a level with the hearth, then contracting or tapering as they curve upward and inward, to the opening *a* into the oven A. *b* is the gas-pipe for the introduction of the petroleum-vapor or hydrocarbon into the combustion-chamber or flues B, at a point below where the same commence to curve, which terminate in transverse extensions or cross-heads *c* provided with burners *d*. C represents the blast-pipes, through which air is introduced into the combustion-chamber B below the gas-pipe, and which may be provided with transverse extensions or cylinders *e* perforated at the upper side for the uniform distribution of the air. H represents the chimney-stack located immediately above the center of the oven A, and into which the flame and gases pass from the oven through the opening *v*. M represents the frame-work of the furnace, and *m* the brick walls of the same. N represents a door for obtaining access to the interior of the furnace, and *n* the hearth of the same.

The operation of my invention is as follows: The blast being let into the combustion-chamber B, the valves in the gas-pipe *b* are then opened, and the petroleum-vapor or hydrocarbon-gas is ignited at the burners *d*, and the flame passes in a thin sheet through the opening *a* into the oven A. When superheated steam is used it may be introduced into the combustion-chamber near the gas-burners *d*. When the furnace is sufficiently heated for the reception of the iron it is charged and worked in the usual manner, as other puddling and reheating furnaces. The petroleum vapor or hydrocarbon may be produced by any generator in use for that purpose, and the air supplied by any known approaches, and the steam from the ordinary boiler and superheater in any manner desired.

What I claim as new, and desire to obtain by Letters Patent, is—

1. The combustion-chamber B, in combination with the boiling and reheating oven A and the central smoke-stack H, substantially as described, and for the purposes set forth.

2. The gas-pipe *b* and blast-pipe *c*, in combination with the combustion-chamber B, oven A, and stack H, substantially as decribed, and for the purposes set forth.

3. The process herein described of puddling and refining iron, the same consisting in subjecting the metal in the hearth of the furnace to the action of petroleum-vapor or gas as fuel, either alone or in conjunction with superheated steam, mixed with a proper amount of air to effect combustion and produce intense heat, substantially as described and set forth.

JAS. G. BLUNT.

Witnesses:
J. LOUGHRAN,
W. R. IRWIN.